Adams & Parsons.
Slide Valve.
No. 3,603. Reissued Aug. 17, 1869.
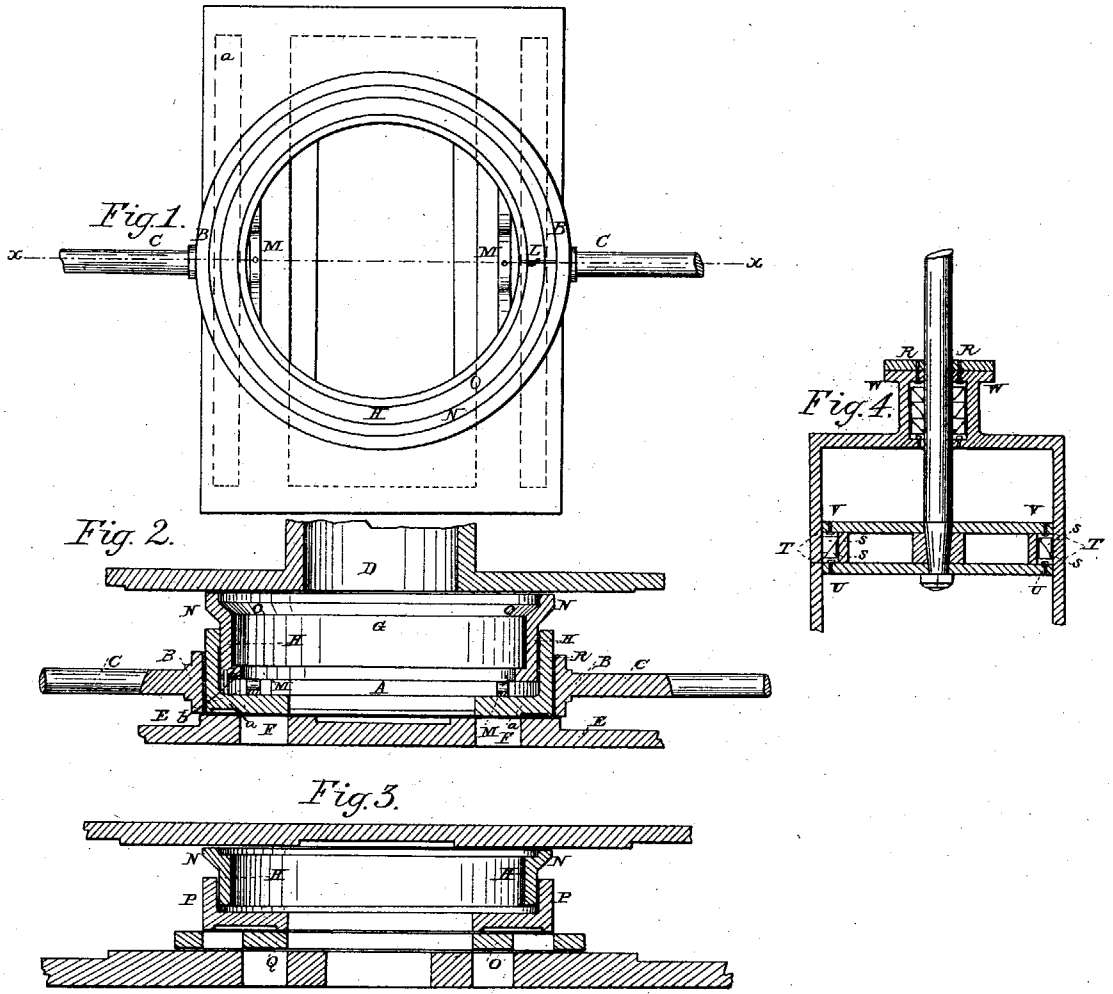
Witnesses.
Faugt Jackson
Alex F. Roberts.
Inventor
Thomas Adams
Geo. John Parsons
Per Munn & Co
Attorneys.
N. PETERS, PHOTO-LITHOGRAPHER, WASHINGTON, D. C.

United States Patent Office.

ORLO CADY, OF MORRISTOWN, VERMONT, AND WILLIAM W. W. WOOD, OF BROOKLYN, NEW YORK, ASSIGNEES, BY MESNE ASSIGNMENTS, OF THOMAS ADAMS AND GEORGE JOHN PARSON.

*Letters Patent No.* 68,932, *dated September* 17, 1867; *patented in England, February* 15, 1866; *reissue No.* 3,603, *dated August* 17, 1869.

IMPROVEMENT IN SLIDE-VALVES.

The Schedule referred to in these Letters Patent and making part of the same.

*To all whom it may concern:*

Be it known that THOMAS ADAMS and GEORGE JOHN PARSON, both of Adelphi, in the county of Middlesex, England, did obtain Letters Patent of the United States, dated September 17, 1867, for a new and useful Improvement in Steam-Engines; and we, ORLO CADY and WILLIAM W. W. WOOD, the owners of the said patent, do hereby declare that the following is a full, clear, and exact description thereof, which will enable others skilled in the art to which our invention appertains, to make and use the same, reference being had to the accompanying drawings, forming part of this specification, and in which—

Figure 1 is a plan view of our slide-valve, with the top plate or cover of the steam-chest removed.

Figure 2 is a central vertical section of fig. 1, through the line *x x*, the valve being shown covering both steam-ports.

Figure 3 is a vertical sectional elevation of the valve, constructed on a somewhat different plan, but involving the same method of producing an equilibrium of pressure.

Figure 4 shows a longitudinal section of a steam-cylinder, with the piston and piston-rod packed, upon the same plan of counteracting pressures, or obtaining lateral pressure, by forcing together wedge-shaped rings, the force exerted through the gland, at R R, being atmospheric pressure.

Similar letters of reference indicate corresponding parts in the several figures.

The object of this improvement is to so construct a valve that there shall be an equilibrium of pressure thereon, or so that the pressure on the upper side shall be balanced by the pressure on the under side of the valve, to the extent of the surfaces exposed to such action; and It consists in inserting and fixing in the central part of the valve, between the two ends thereof, a ring, constructed with a flange on its outer side, over the top surface of the valve, the top side of the flange forming a fillet, to work against the cover of the valve-chest, and of equal area with the bottom side of the flange.

This ring is also constructed and fitted so as to admit of an equal area of steam-space above and below its inner part.

By the insertion of a ring so constructed, the steam from the boiler will be caused to act simultaneously on the bottom of the flange, thereby pressing the ring upward against the cover of the valve-chest, and on the fillet or top of the flange, of equal area, thereby pressing the ring downward. The steam from the boiler will thus be caused to act over an equal area between the cover of the valve-chest or the division-plate, and the fillet or top of the flange, and between the bottom of the flange and the top of the valve, thereby balancing the pressure on the outer part of the ring.

The recess or steam-space, at the top of the inner part of the ring, is equal in area to that at the bottom of the same, and the ring is balanced by the pressure of the exhaust steam acting equally thereon.

A represents the valve.

C, the valve-rod secured to the bridle.

B, the inlet-port of the steam-chest, may be made in any proper place, either upon the top or sides.

E, the cylinder-face.

F F are the steam-ports in the cylinder-face.

G is the exhaust through the cover of the steam-chest.

H is a ring, inserted in the valve A, for the purpose of effecting the required displacement of steam, so as to cause a balance of steam-pressure.

This ring H is cast larger than the cavity of the valve A. A piece, say one-sixteenth of an inch, is cut out of it. The ring is then drawn together at but-joint, shown at L, fig. 1, and, in that position, bored and turned in the lathe, to fit its place in the valve. A steady-pin, *b*, fig. 2, is used to keep the but-joint in the centre line of motion.

Two small springs, M M, are inserted between the ring and valve, in order to keep it up to the cover of the steam-chest, while steam is off.

The ring H is provided with a fillet, N, which works against the cover D, and the ring is recessed inside, at O.

The steam in the chest acts from the boiler simultaneously under the fillet, or on the bottom of the flange, thereby pressing the ring upward against the cover D, and on the fillet or top of the flange of equal area, thereby pressing the ring downward. The steam being thus caused to act over an equal area between the cover D and the fillet or top of the flange, and between the bottom of the flange and the top of the valve, thereby balances the pressure upon the outer part of the ring; or, in other words, the steam, being allowed to act under the fillet, and exerting its influence between the top side of the fillet and the cover, is held in an equilibrium of pressure.

The ring H being recessed at O, the exhaust pressure of a high-pressure engine, and the vacuum of a low-pressure engine, act equally on the top and bottom sides, holding it in an equilibrium of pressure.

The recesses *a a*, in the face of the valve, are for the purpose of maintaining the film of steam on the bars during high grades of expansion; also, serving the purpose of lubrication by steam.

Fig. 3 shows a valve, constructed on the same principle as the one described, but on a different plan.

This principle of balancing the opposite surfaces, which are exposed to the action of steam, may also be employed with good effect in the construction of pistons and glands, as shown in red in fig. 4, described as follows:

Two packing-rings, S S, are pressed outward against the inside of the cylinder, by the pressure of steam in a vertical direction. T T are rings, provided with recesses or steam-spaces, U U, by which the amount of power pressing against such rings may be regulated, according to the surface of such recesses. The amount of force on the outer surface of the rings S, and the inner surface of the cylinder, may be regulated by varying the angle of the rings S. Steam is admitted to the recesses U through small holes, V V; but it may also be applied directly to the rings S, dispensing entirely with the rings T. The gland W is made substantially the same as the piston, except that the atmospheric air acts through the outer holes R instead of steam.

Having thus described the invention,

We claim, and desire to secure by Letters Patent—

A slide-valve, having a ring, H, provided with a fillet, N, and recess, O, so that the pressure of steam on the different surfaces will balance the valve, substantially as described.

In testimony whereof, we have signed our names to this specification, each before two subscribing witnesses.

ORLO CADY.
WM. W. W. WOOD.

Witnesses to the signature of ORLO CADY:
G. W. HENDEE,
VIOLA L. HENDEE.

Witnesses to the signature of W. W. W. WOOD:
JOHN WHITE,
C. HOWSON.